United States Patent [19]

Wade

[11] Patent Number: 5,554,343
[45] Date of Patent: Sep. 10, 1996

[54] PARTICLE AND LIGHT AND HEAVY FLUID SEPARATOR

[76] Inventor: Brian Wade, 23 Hookstone Avenue, Harrogate, North Yorkshire HG2 8ER, England

[21] Appl. No.: 386,211

[22] Filed: Feb. 9, 1995

Related U.S. Application Data

[63] Continuation of Ser. No. 78,221, filed as PCT/GB92/00150 Jan. 27, 1992, published as WO92/13180 Aug. 6, 1992, abandoned.

[30] Foreign Application Priority Data

| Jan. 29, 1991 | [GB] | United Kingdom | 9101836 |
| Feb. 12, 1991 | [GB] | United Kingdom | 9102886 |
| Oct. 19, 1991 | [GB] | United Kingdom | 9122230 |

[51] Int. Cl.$^6$ .................. B01D 50/00; B01D 53/24; B01D 19/00
[52] U.S. Cl. .................. 422/177; 55/404; 55/405; 95/34; 95/35; 96/195; 96/196; 96/208; 96/209; 96/210; 96/216; 96/217
[58] Field of Search .................. 422/169, 177; 55/404, 405; 95/26, 34, 35; 96/195, 196, 208, 209, 210, 216, 217; 60/280, 299, 300, 302, 311

[56] References Cited

U.S. PATENT DOCUMENTS

| 2,441,631 | 5/1948 | Hills | 55/404 |
| 2,792,909 | 5/1957 | Court . | |
| 2,942,687 | 6/1960 | Kollander . | |
| 3,236,045 | 2/1966 | Berger et al. . | |
| 3,955,757 | 5/1976 | Lowry . | |
| 4,088,459 | 5/1978 | Tuzson | 96/217 |
| 4,600,413 | 7/1986 | Sugden | 96/216 |
| 4,840,645 | 6/1989 | Woodworth et al. | 55/405 |
| 4,902,487 | 2/1990 | Cooper et al. | 423/215.5 |

FOREIGN PATENT DOCUMENTS

| 2530829 | 2/1976 | Germany . |
| 1500057 | 2/1978 | Sweden . |
| 1465820 | 3/1977 | United Kingdom . |

OTHER PUBLICATIONS

Hitachi Seisakusho KK, "Environment Protection Type Gas Turbine", Japanese Patent Abstract, vol. 10, No. 6 (Sep. 1985).
Toyota Jidosha Kogyo KK, "Exhaust Device for Automobile", Japanese Patent Abstract, vol. 8, No. 96 (Jan. 1984).

*Primary Examiner*—Robert J. Warden
*Assistant Examiner*—Christopher Y. Kim
*Attorney, Agent, or Firm*—Klauber & Jackson

[57] ABSTRACT

A fluid centrifuge device for separating fluids and/or solids comprises a non-rotatable containment vessel (6) and a rotatable shroud (6A) of conical or other form within said vessel (6). The vessel (6) is located between an inlet assembly (2) including a manifold (8) which leads to the interior of a tubing housing (14) of a turbocharger and an outlet assembly (4) including two outlets (10, 10A) for respectively clean and dirty gases. The shroud (6A) is mounted on a drive shaft (20) for rotation therewithin. The shaft (20) and the shroud (6A) are driven by turbine blades (16) or by other drive.

59 Claims, 6 Drawing Sheets

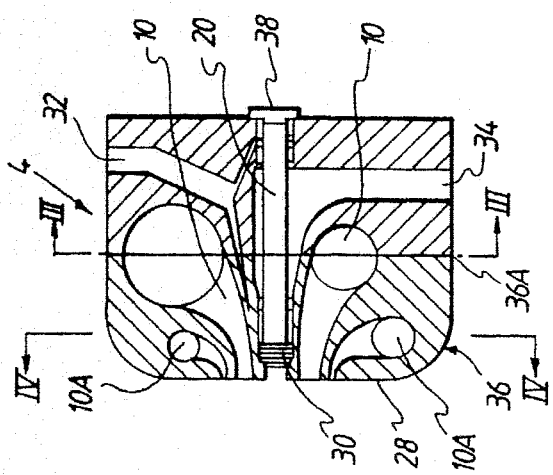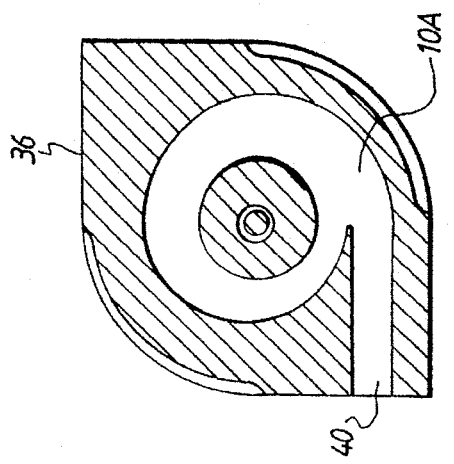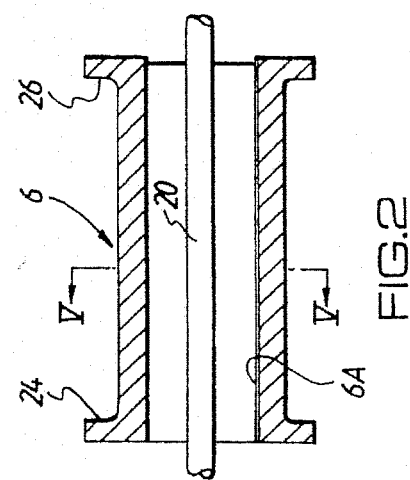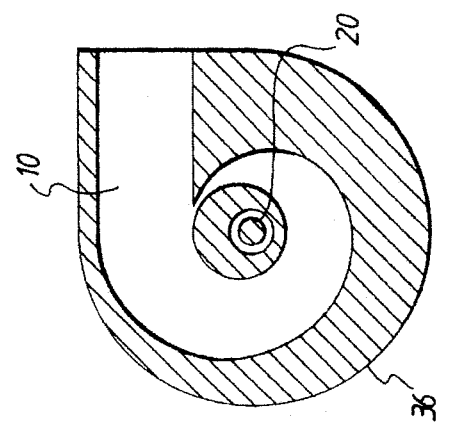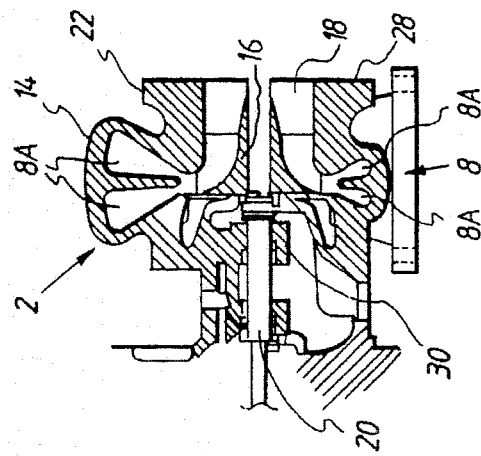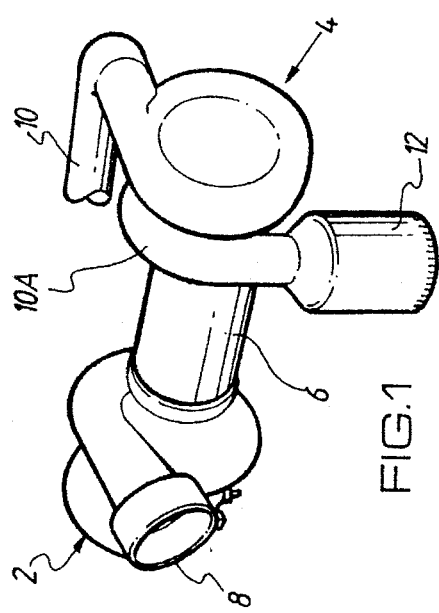

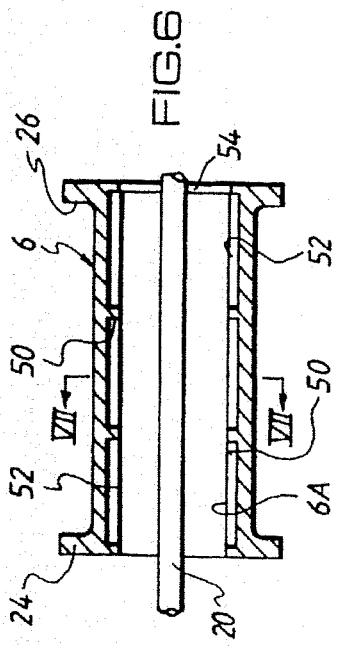
FIG.6
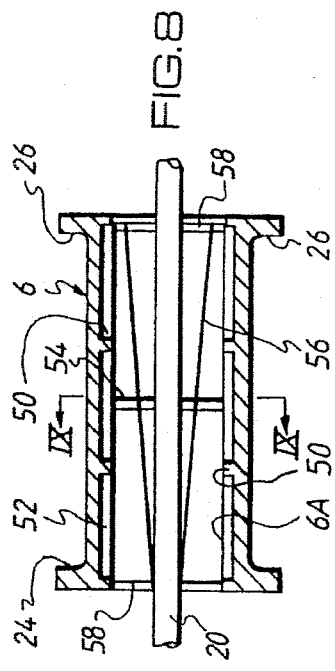
FIG.8
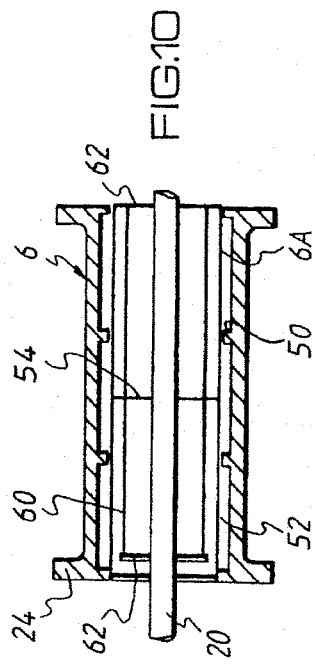
FIG.10
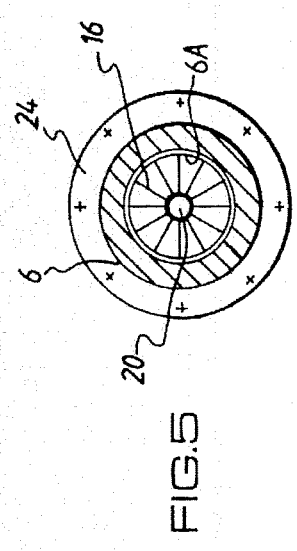
FIG.5
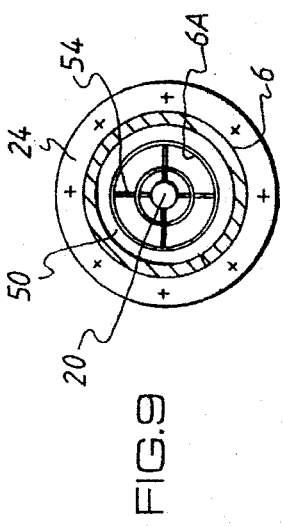
FIG.7
FIG.9

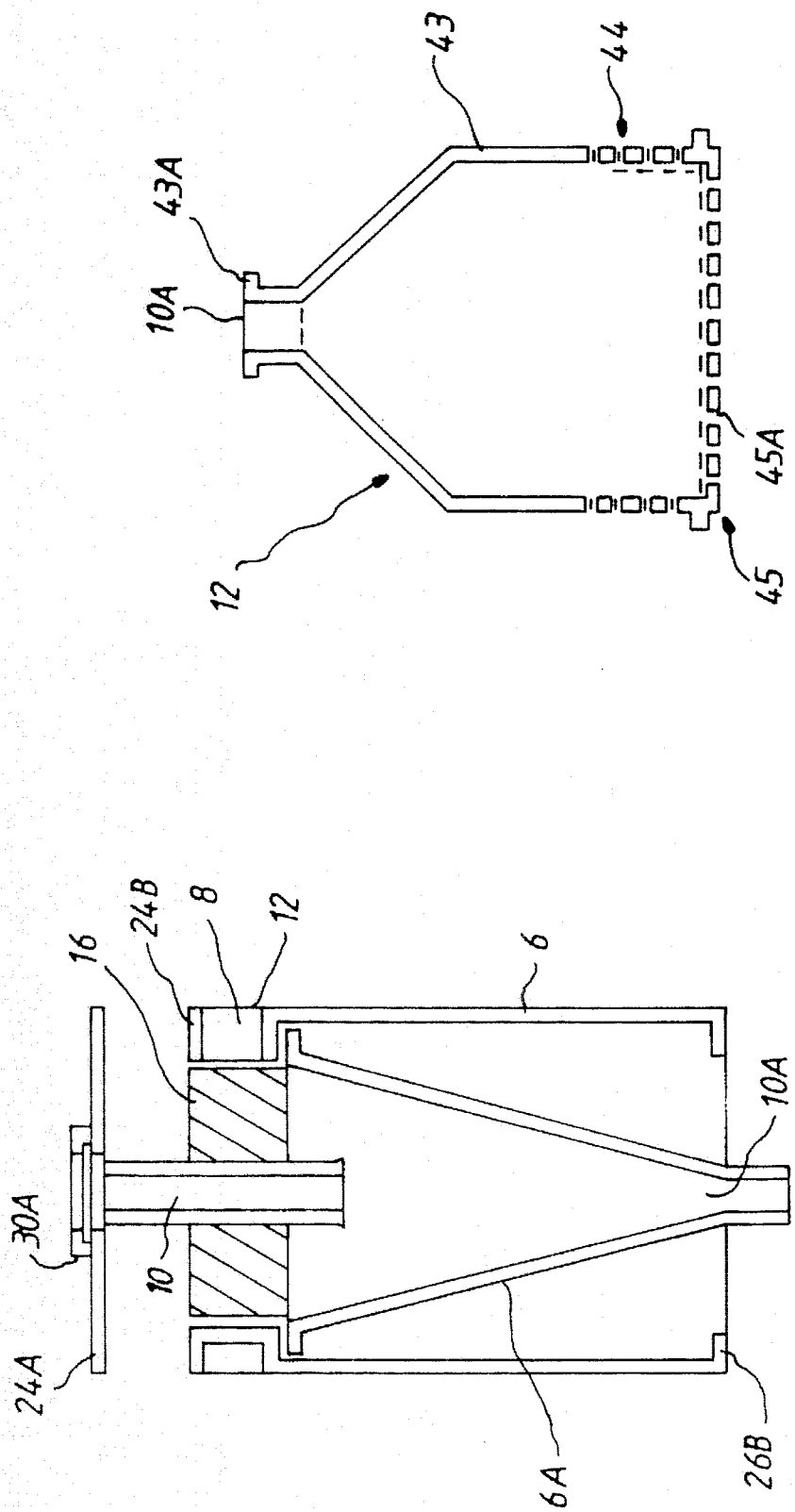

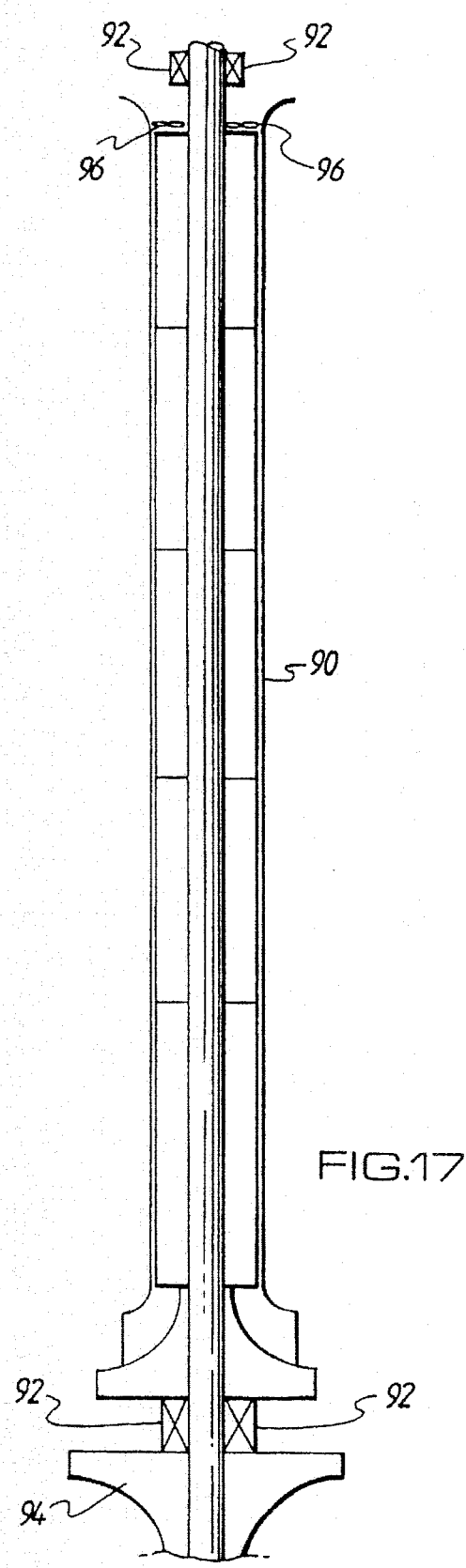
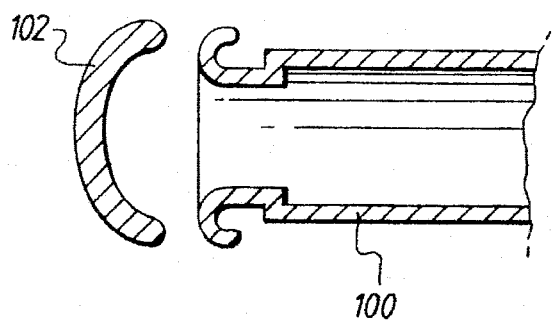
FIG.17
FIG.18

PARTICLE AND LIGHT AND HEAVY FLUID SEPARATOR

This application is a Continuation of application Ser. No. 08/078,7221, filed as PCT/GB92/00150 Jan. 27, 1992, published as WO92/13180 Aug. 6, 1992, now abandoned.

This invention relates to particle and light and heavy fluid separators, and more particularly to fluid centrifuges for removing or separating elements suspended in a gaseous, liquid, or solid medium and various combinations thereof, to be generally referred to herein as fluids.

Particle separators or, as they are often and sometimes called, cyclones or centrifuges, for separating gases and/or gases and particles are not new and have proved effective within certain limitations. Many prior proposed particle separators suffer from numerous disadvantages, but by utilizing the basic principles of particle separators and modifying the same, an improved form of separator can be created for diesel engines and for other uses.

Gas centrifuges are conceptually very simple: they are long, they rotate at very high speeds—up to 100,000 rpm—and have been used in the nuclear industry for many years to separate two uranium isotopes, namely U235 and U238, the uranium being in gaseous form as uranium hexafluoride and being passed into the centrifuge and then to the center thereof.

Uranium hexafluoride is a peculiar material—in a fluid dynamic sense—in that the speed of around Mach 1 is only about 90 m/s at ambient temperatures and thus with the rotational speeds used (500 m/s or up to 100,000 rpm), supersonic flow exists with associated shock waves and losses. Nevertheless, such systems are now used in several countries in very large numbers, not only for separating uranium isotopes, but also for separating various chromium isotopes, even though the technology involved is relatively expensive and necessitates the centrifuge rotating in a near vacuum so as to minimise drag on the external and stationary containment vessel of the device.

For air or combustion products, Mach 1 is directly proportional to the square root of absolute temperature—being of the order of 340 m/s at 293K and 600 m/s at 900K—and thus the centrifuge for these gases need not operate under supersonic flow conditions with obvious benefit to parasitic losses, drag etc, as well as constructional costs.

The important factor is that the technology exists to centrifugally separate gases having only small density differences (molecular weight, i.e. 3 parts in 238) and the present invention seeks to apply the technology of gas centrifuges to the cleaning of diesel engine exhausts, and other exhausts, as well as other separating procedures.

In a centrifuge, the very strong centrifugal force fields tend to fling heavier materials close to the walls of the device from where it is removed, while lighter material is removed at a smaller radius of the device. A complex secondary flow pattern is set up which is used to direct the heavier material to the appropriate part of the device.

Diesel engine exhaust contains a mixture of gases which include large quantities of carbon dioxide and water vapor, together with trace quantities of nitrogen oxide, sulphur dioxide, carbon monoxide and hydrocarbons (i.e. unburnt fuel or partially burnt fuel) and fine particulate matter. The particulate matter is very polydispersed in nature ranting in size from 40–50 micron down to 0.1 micron. It is typical that 90% of the particulate matter is less than 1 micron with a very significant proportion, i.e. some 80%, in the size range 0.1 micron to 0.5 micron, and is therefore very difficult to separate.

Complications arise with the high temperatures (700° C. to 800° C.) and the condensation of tars (hydrocarbons) as the gas cools. This includes sulphate deposits on particulates at temperatures below 400° C. Moreover, due to the high gas temperatures, the speed of sound is in the order of 600 m/s allowing very high centrifugal force fields to be generated without the complication of transonic/supersonic flow and associated shock waves.

It will thus be evident that the design of a fluid centrifuge for the cleaning of diesel engine exhaust and other exhausts will need to be radically different to that previously described due to the beneficially different gas characteristics and the need to minimize costs for vehicle application, for example, but the possibility exists for using fluid centrifuges for the cleaning of diesel engine exhausts, and other exhausts as well as other separating processes, due to the evolution over the last few decades or so of high speed turbocharger systems.

Diesel and other engine turbochargers use the high temperature gases from the engine exhaust to drive a turbine which in turn drives a centrifugal compressor which compresses the air/fuel charge prior to the charge entering the engine and thus considerably increases the power output of the engine. The turbocharger rotates at speeds of up to 100,000 rpm with rotor tip velocities in the order of 500 m/s, and are thus capable of generating the very high centrifugal force fields that are necessary for fine particulate gas to gas separation.

Thus the possibility exists of combining the technologies of the gas centrifuge and the turbocharger to produce an integrated turbocharger/gas cyclone or fluid centrifuge system at a very cost effective price, even though it is inevitable that such a combination will absorb more power energy from the exhaust gas. However, considerable energy reserves exist, because at the moment only 30% of the available energy is extracted by conventional turbocharger designs.

Theoretical calculations have indicated that very high separation capability should be achievable down to particles of a size of 0.1 micron. Separation of high molecular weight hydrocarbons arid other such gases from the remainder should also be possible.

One well known method of removing particles from gas streams involves the use of cyclones or other forms of separators, but in general, these separators cause the air to flow in a circular or helical path so that the particles are forced to the outside path where they can be collected and the clean air may be removed from the center of the circle or helix. The particles fall under gravity, or can be carried by a small quantity of gas flow to a small filter, and are collected in a manifold through a waste duct to an appropriate container.

It will be understood that because of the helical or circular movement of the gas within the cyclone the exhaust gas in the pipe will flow in a relatively turbulent fashion and therefore will include regions of relatively low energy which are likely to reduce the effect of separation.

There are fundamental limitations to the separative performance of conventional cyclones, caused by wall turbulence effects between the stationary wall and the high velocity flow. Typically, a high efficiency cyclone removes all particles of a size of about 5 micron, but only 50% of a size of about 3 micron, and possibly 20% of a size of about 1 micron.

The point at which the turbulence of the gases is most destructive of separation efficiency is where the said gases enter the separation chamber.

The aim is to produce two gas streams: one comprising of at least 50% and preferably 80% or more of the total flow and being virtually clean and thus being capable of being directly discharged to the atmosphere, and another which contains most of the pollutants; (particulate and heavy hydrocarbons) and which can be economically treated by techniques such as exhaust gas recirculation, catalysts, and filters (as are being manufactured by many of the large engine manufacturers). The concentration of pollutants into less than 50%, preferably 20% or less, of total gas flow considerably reduces the cost of cleaning the gas and any storage of waste. The above ratios may be varied.

Particle emissions are unavoidable in diesel engine combustion, and the quantities and composition of these emissions are largely dependent upon the method of combustion and the setting of the diesel engine, and upon the operating conditions and the composition of the fuel. The particles consist of solid and volatile elements, the composition of which is dependent upon the type of the driving operation.

Emissions from an engine working at full load make up to approximately 90% of solid matter consisting of soot particles and sulphur compounds.. These substances are gaining ever increasing attention from the environmentally conscious public which considers that the attached hydrocarbons are particularly damaging to health.

Some oil consumed by an engine is not completely burnt to $CO_2$ (carbon dioxide) and water vapor, nor is it even possible to do so in the case of metallic additives. Instead, these products of oil consumption/combustion exit the engine as particulates.

Of prime relevance to the invention is the particulate and possibly HC (hydrocarbon) standards, but the CO (carbon monoxide) and the $NO_x$ (nitrogen oxide) are also important in that the existing engine has to be set up in a particular way to meet the required emission standards. Quite often penalties also accrue in terms of fuel consumption.

The particulate definition includes anything of soot or carbonaceous nature as well as aerosols, organics derived from partial combustion of fuel and lubricant, as well as unburnt raw fuel and lubricant.

It should be noted that many existing diesels (often up to 10–20 years old) emit a wide size dispersion of particles as shown by visible black smoke from existing lorries, trains, ships etc.

Gas flow patterns in the traditional manner allow the dirty gases to locate and allow agglomeration at the external walls and the clean gases to take up a central position.

The present invention seeks to provide a fluid centrifuge device which uses the technology and principles of turbochargers and gas centrifuges and which will be relatively inexpensive to produce.

According to the present invention there is provided a fluid centrifuge device comprising a non-rotatable containment vessel, a hollow tubular rotatable shroud within said vessel, a non-rotatable inlet assembly and a non-rotatable outlet assembly, and means to drive said shroud, said containment vessel and said shroud being located between said inlet assembly and said outlet assembly, said outlet assembly including an outlet for clean gas and an outlet for dirty gas The shroud may be parallel sided or it may be of conical form.

When driven, the shroud may be connected to turbine blades or it may be connected to a drive shaft of the device and/or a turbocharger, or may be driven by other means.

The shroud may be provided with solid walls, or its walls may be perforated or of mesh like or other apertured formation such that particles may pass through the walls of the shroud.

The containment vessel will preferably mimic the form of the shroud.

Preferably, the rotational speeds of the device will be varied by means of clutch(es), governors, gearing, turbine design or inlet and outlet assembly form and function.

The device will preferably be entirely self-contained and designed as a bolt-on fixture.

The centrifuge and inlet and outlet assemblies may be coated internally with a catalyst.

The shroud may include a length of apertured material to aid the process of separation and promote the required reactions, and the length of apertured material may be coated with a catalyst.

In order that the invention may be more readily understood, embodiments thereof will now be described, by way of example, reference being made to the accompanying drawings, wherein:

FIG. 1 is a schematic perspective view of a fluid centrifuge in accordance with a first embodiment of the invention;

FIG. 2 is a cross-sectional elevation of the device shown in FIG. 1 and illustrating in detail the constituent parts of the device;

FIG. 3 is a cross-sectional end elevation taken on line III—III in FIG. 2;

FIG. 4 is a cross-sectional end elevation taken on line IV—IV in FIG. 2;

FIG. 5 is a sectional elevation taken on line V—V in FIG. 2;

FIG. 6 is a longitudinal sectional elevation of an alternative form of part of the device shown in FIG. 2;

FIG. 7 is a sectional end elevation taken on line VII—VII in FIG. 6;

FIG. 8 is a longitudinal sectional elevation showing a further alternative form of said part;

FIG. 9 is a sectional end elevation taken on line IX—IX in FIG. 8;

FIG. 10 shows an alternative form of the part shown in FIGS. 8 and 9;

FIG. 11 shows yet another form of said aforementioned part;

FIG. 12 is an enlarged view of a particle collector used in association with the device of the invention;

FIG. 17 is an elevation of a fluid centrifuge device in accordance with a further embodiment of the invention, and being particularly suitable for the removal of methane from a gas stream; and FIG. 18 is a scrap view of an air pre-cleaner for use with a fluid centrifuge device in accordance with the invention.

Figure 15:
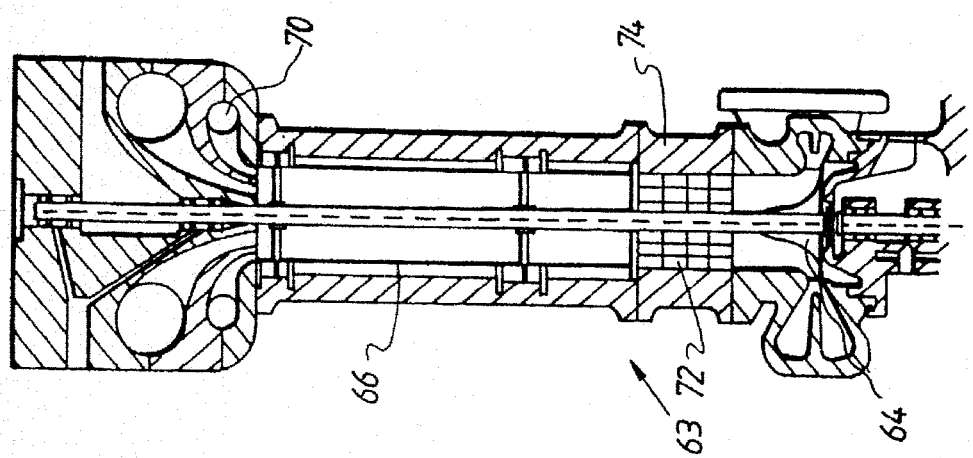
FIG. 15 shows a variation of the fluid centrifuge device of FIG. 14.

Referring to the drawings, and first of all to FIG. 1, the cleaning device or fluid centrifuge in accordance with the invention comprises in combination a turbocharger or other gas inlet assembly 2 and a gas outlet assembly 4 which are connected together by a non-rotatable containment vessel 6. The turbocharger 2 or the gas inlet system includes a manifold 8—which may be a mixed flue port (as shown with mixed flues 8A) or a single port—which leads to the interior of the turbocharger 2 and outlet assembly 4. The assembly 4 has a clean gas outlet 10 and a dirty gas outlet 10A. A particle collector or trap 12—see FIGS. 12 and 13—attaches to the outlet assembly 4. This collector removes the particles and allows 20% to 50% or more of the gases to pass through or be recycled to the engine.

If desired, the inlet assembly may be attached to the outlet assembly direct without the containment vessel between them.

Referring now to FIGS. 2 to 5, the turbocharger or gas inlet 2 comprises a turbine housing 14 having exhaust gas turbine blades 16 which may have a shrouded or unshrouded cylinder. The dirty exhaust gas inlet is shown at 8, whilst the dirty exhaust gas outlet is indicated by the reference numeral 18. A central drive shaft is shown at 20 but it will be appreciated that the device may be driven by a motor or other power sources and may not necessarily be connected to a turbocharger drive shaft or turbine. If preferred, the centrifuge may be driven by fluid pressure, variable gear box, pulley and belt systems, electric or other power systems. The turbocharger 2 is connected to the vessel 6 by means of a flange 22 on the turbocharger and a flange 24 on the vessel, the vessel being in turn connected to the outlet assembly 4 through the intermediary of a flange 26, seals or separator materials 28 being located between the flanges 22 and 24, and also between flanges 26 and the outer assembly 4. The seals may be of differing materials in consideration of the components, the materials also being dependent upon functional and temperature requirements.

If desired or necessary, seals may be located at other points.

Located at each end of the centrifuge are bearings 30 complete with oil seals, said bearings being in relationship to the standard bearings of a turbocharger. As an alternative, other types of bearings such as magnetic, compressed air etc may be used.

It may also be necessary to locate one or more bearings along the length of the central drive shaft 20 or shroud 6A in order to give a greater degree of stability.

Lubricating oil or other substances will be supplied and drained to and from all of the bearings. The lubrication could be supplied through inlet 32 and will exit through through outlet 34.

The containment vessel 6 is of generally circular cross-section and is of a smooth nature having parallel sides. The vessel contains an inner cylindrical shroud 6A which is connected to and rotatable with the turbine blades 16. The containment vessel and shroud may be variable in size, diameter and length.

The shroud is provided so that the gases and particles are thrown against a revolving surface. The shroud 6A rotates to prevent undue turbulence normally associated with static walls of cycloning or centrifugal devices or other similar and like devices.

The outlet assembly 4 includes a housing 36. As will be seen from the drawing, housing 36 is formed in two halves or more between which is located a seal 36A, the outlet assembly 4 being provided with a bearing shaft end cap 38. Associated with the outlet assembly 4 is the dirty gas waste collection means 12. The collection means—referring now to FIG. 12—is in the form of a collection chamber or trap 43 which is connected to the assembly through means 43A to prevent the particles collected being directly released to the atmosphere during the emptying of the chamber or trap. The chamber or trap allows the dirty gases etc to enter said chamber or trap via outlet 10A and is so designed as to remove the particles and heavy gases while allowing light gases (nitrogen, carbon dioxide, oxygen etc) to pass through perforations 44 in the chamber or trap. An end cap 45 which may be attached or removable and which has perforations 45A therein permits the throughput of gases which may be recycled to the endline etc.

The collection chamber or trap may be provided with a bayonet-type connector which when twisted and thrust upwardly opens an iris (not shown) in the neck of the chamber or trap when the latter is connected to the assembly 4. Conversely, and when the collection chamber or trap is removed, the opposite action takes place, i.e. the iris is closed so as to prevent inadvertent discharge of particles. A dip stick (not shown) may be provided to enable the quantity of particles in the chamber or trap to be ascertained. The length and capacity of the chamber or trap will be such as to permit collection of particles between appropriate time or service periods of a vehicle unit.

Figure 13:
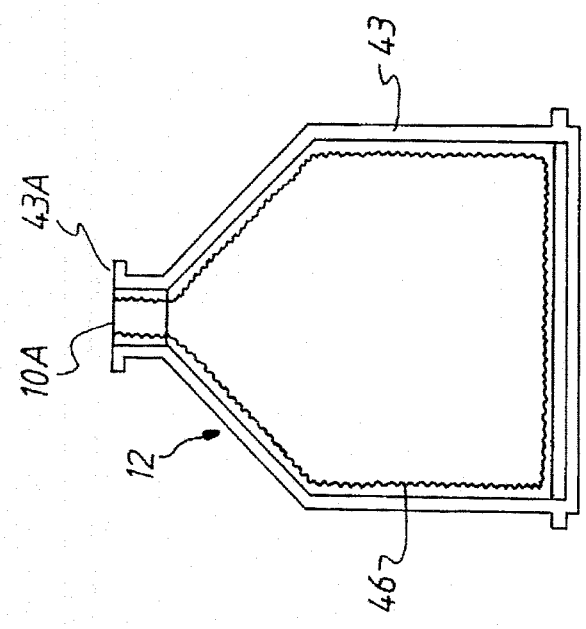
FIG. 13 shows an alternative form of the particle collector.

In an alternative arrangement of the collection chamber or trap—referring now to FIG. 13—the chamber or trap 43 may act only as an outer cartridge to protect a metallic or other material bag 46 which may be self-sealing and into which particles are passed from the assembly 4. The bag is intended to be dispensed with and replaced with a new bag. The chamber or trap may also be dispensed with along with of the bag if desired. The trap or chamber may have the perforations and end cap as before described with reference to FIG. 12.

An alternative form of particle collector will include a valve located in a nose of the collector such that the collector may be emptied without being removed.

In an alternative arrangement a collection chamber may be connected to the clean gas outlet 10.

It is intended that the collected particles be utilized as waste products for other purposes.

Alternatively, a flexible or rigid pipe may be attached, the pipe being of any desired length and cross-sectional shape. Such a pipe will enable the particle collector or trap to be placed in any orientation with respect to the axis of the centrifuge device.

Instead of the collection chamber or trap 12, absorbent filters, burn-off techniques, or other means may be used to dispose of the particles.

It will be appreciated that the above-described cleaning device or fluid centrifuge is particularly suitable for the cleaning of diesel engine exhausts, but the device has many other applications, some of which will be referred to hereinafter.

In its application to the cleaning of diesel engine exhaust, the above-described cleaning device or fluid centrifuge will normally be located within the engine compartment, although it will be appreciated that other locations on the vehicle may be used. While the device is illustrated for use in a horizontal position, other orientations (dependent upon requirements) may be appropriate. The device can be fitted to a standard turbocharger or other gas system, or it may be fixed to permit the device to have an independent power source. The device may be so positioned as to take the exhaust gases from the diesel engine direct.

The device is designed to be installed downstream of the engine (or other apparatus) and[ will be of appropriate size and form to act as a replacement for the usual and conventional silencer box in the exhaust system of an internal combustion engine.

The device may be fixed in position by means of brackets, straps, or by any other appropriate means, not shown.

The basic invention was originally based upon a static location, but development for a condition which imposes vibration, shock and other factors must now be addressed if the device is to be located, for example, onto a diesel vehicle. It is therefore proposed to locate the device and all the necessary supportive components onto a framework that can remain stable, while vibration, shock and general or extreme road conditions together with unstable movement at varying speeds. Shock absorbers and dampers are fixed to the framework as required. The framework must also provide the ability to rotate while the fluid centrifuge device remains stable and also to allow the device to maintain its position although the vehicle may be rolling and going up and down hills. This may be controlled with a gyrostabilizer or similar devices.

There may be a series of sizes of the device in accordance with the invention, such sizes being related to the volume input and the various types of materials that need separating and cleaning, and devices in accordance with the invention may be joined and/or used in conjunction with each other, and may have a common collector.

Component parts of the device will be primarily of various metals and the surfaces of all materials used should have a smooth or special electropolish finish to reduce the friction factor. Alternatively, other suitable materials may be used, the materials to have a smooth finish. The outlet assembly 4 and the containment vessel 6 will be manufactured of material able to withstand the high temperatures created by exhaust gases from internal combustion engines or other apparatus. While the outlet assembly illustrated has two exit ports, this is variable dependent upon the materials being separated.

The device will preferably include diaphragm sensors or other sensors so that the flow from engine output or other systems can be adjusted.

In use, exhaust gases from the diesel engine or other engine (not shown)—the gases are at a temperature of approximately 700° C.—enter the turbocharger through the inlet 8 where the dirty gas impinges on the turbine blades 16 whereby the gas is accelerated before entering, via the outlet 18, the rotating inner shroud 6A of the containment separator vessel 6. In the shroud 6A, the gases come into contact with the rotating walls thereof and travel down the shroud and into the outlet assembly 4. The high centrifugal force field created confines the heavier gases and particulate matter to the outer wall region of the shroud while allowing lighter gases and material to remain in the central region. The clean gas leaves the outlet assembly 4 via the outlet 10 while the dirty gas exits via the outlet 10A to be directed to the collection chamber or trap 12, or the gases leaving the outlets 10 and 10A or any other outlets as may be desired may be directed into similar separators of the same size and design or various sizes and designs as illustrated, or to other means such as those referred to previously. The sizes and designs will be dependent upon the volume throughput. The mixture of gas streams leaving the device in a combined vortex and parallel form thus eliminates noise usually associated with engine silencers when exhaust gas is discharged to atmosphere.

Referring now to FIGS. 6 and 7, showing a different and alternative form of containment vessel 6, the vessel, with its inner shroud 6A, is provided on its inner surface with steps 50 which are provided to reduce any leakage flow of the gases and which create recesses 52 to prevent drag on the shroud 6A. Support struts 54 are provided for the shroud 6A.

Another form of containment separator vessel is shown in FIGS. 8 and 9. Referring to these Figures, the containment separator vessel 6 having the steps 50 and recesses 52, has a shroud 6A which is mounted on the shaft 20 for rotation therewith and which has struts 54. Located within the shroud 6A and connected thereto or to the shaft 20, is an additional conical shroud 56 whose walls may be solid or perforated or of a mesh-type formation and which provides additional rotating surfaces to accelerate the dirty exhaust gas as it passes through the shroud to the outlet assembly 4. The shroud may have perforated end plates 58 and may take up a reversed position.

Instead of the inner vessel 56 being conical as shown in FIGS. 8 and 9, it may take the form of a cylinder 60 with or without perforations—as shown in FIG. 10, the inner vessel being provided with supporting end plates 62 which may be perforated.

Referring now to FIG. 11, the containment separator vessel has an inner conical shroud 6A connected to the turbine blades 16 so shaped that the whole including the shroud 6A and outlets 10 and 10A all rotate to permit the separation activity of the device, and the containment separator vessel 6 is provided, as will be seen, with a tangential dirty gas inlet 8. The containment separator vessel is connected to the turbocharger 2 or inlet assembly or any other exhaust system. The conical shroud 6A allows the gases to rotate within, collecting the heavy gases at its outer edge and allowing these dirty gases to exit at 10A and the clean gases to remain in a central position within the shroud and exit at 10.

Flanges 24A and 26A are fixed to the containment separator vessel at 24B and 26B.

Bearings 30A are located to support outlet pipes of gas at 10 and 10A, said pipes being connected to the turbine blades 16 and the shroud so that all these components rotate between the bearings 30A.

There is no drive shaft shown in FIG. 11, although one may be provided if so desired.

It will be appreciated that instead of the outlets 10A being located at the opposite end of the device to the inlet 8, they may be located along the length of the device or appropriately positioned adjacent to the inlet port.

While the above described device according to the invention has outlined! its use in relation to a diesel engine, it will be appreciated that this is but one of many uses of a device in accordance with the invention, since use of the basic principles of the device would permit the separation of fluids., i.e.

Gas—Solids

Heavy Gas—Light Gas

Heavy Liquids—Light Liquids

Liquid—Solids

Gas—Liquid (Aerosol Fume)

and any combinations or mixes of the above-referred to separations.

Figure 14:
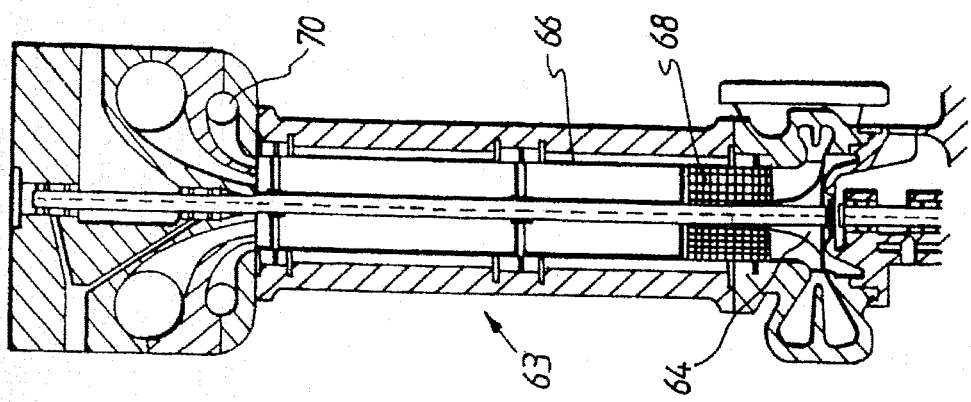
FIG. 14 shows a still further alternative form of a fluid centrifuge device in accordance with the invention.

Referring now to FIG. 14, the embodiment illustrated again principally intended for use for the cleaning of diesel engine exhaust—proposes the use of fine carbon particles naturally formed by combustion processes as a nucleation center onto which water/$SO_3$ may condense, thus making it easier to remove the now larger particles.

The sulphate combines steam/water vapor and condenses on the soot carbon particles, thereby substantially increasing the particle emission., It is important to have the correct time and temperature in order to allow the reaction to catalyze correctly, and thus it is proposed to coat the turbine and centrifuge with a suitable catalyst to oxidize the $SO_2$ and $SO_3$.

It may be necessary to feed the upstream (or systems) with a finely divided carbon (i.e. soot) in order to make more nucleation centers so as to remove more $SO_2$ and $SO_3$.

The application involves using the basic principles of the centrifuge device (as will be hereinafter described) to enhance the separative power of the centrifuge while at the same time solving the sulphur problem. It may also reduce the necessity for fuel oil refineries to reduce the sulphur content of diesel fuel to 0.5% so that standard exhaust catalysts can be used to meet the 1994 United States emission standards.

The use of noble metal catalysts in oxidizing catalytic converters has been successfully demonstrated on diesel engines as a technique for very substantially reducing hydrocarbon and carbon monoxide emissions (not $NO_x$), and indeed the resulting engine can produce very much less emissions overall than the equivalent gasolene engine. However, this is only true when a fuel oil with a very low sulphur content is used, as unfortunately many noble metal catalysts at the same time as oxidizing hydrocarbons and/or carbon monoxides, also promote an undesirable reaction, namely the oxidation of $SO_2$ and $SO_3$ at temperatures above approximately 350° C. When these come into contact with Water (as steam), a hygroscopic sulphate forms that bonds approximately 1 to 3 times its mass in water; this occurs at the so-called acid dew point in the temperature range 100° C. to 200° C. The formation of sulphur trioxide from sulphur dioxide is greatly dependent upon temperature and the type of catalyst used: it is widely acknowledged as a serious problem.

Although the amount of soot emitted remains constant, particulate emissions increase by typically 140% when a comparison is made to the production series catalyst equipped engine—fired on very low sulphur fuel—and arises due to the absorption of sulphates onto the soot particles.

The device of FIG. 14 will promote the formation of large particles and their separation. The centrifuge device 63 is coated internally with an appropriate, probably platinum based, catalyst. Thus, in FIG. 14, the turbine 64 and shroud 66 of the centrifuge device 63, as well as the inlet assembly, outlet assembly and other surfaces, are coated internally with the platinum based catalyst. In order to aid the process and promote the reactions which are required, a short length of fairly open honeycomb matrix 68 coated with a catalyst is inserted in the first section of the shroud 66. As a result, considerable size/growth agglomeration of the particulate burden occurs, making them much easier to collect in the dirty gas stream 70, which may as a consequence be reduced to only 5% to 10% of the total. It will be appreciated that gas cooling of the outer surface of the shroud will be needed to promote condensation of water/sulphate onto the fine carbon particles. The clean gas stream will not be cooled as much as the dirty gas stream as it will have little contact with the cooled shroud and thus will have a temperature too high to induce any following catalyst to oxidize remaining hydrocarbons and carbon monoxide. There are however excellent possibilities that all hydrocarbons and carbon monoxide will be oxidized by the honeycomb matrix 68.

In an alternative arrangement, shown in FIG. 15, the honeycomb matrix 72, again coated with a catalyst, is inserted as a separate unit 74 located between and attached to the turbine 64 and shroud 66.

In some cases, it may be desirable to increase the surface area of the honeycomb matrix catalyst area: this would be done by increasing the number of turbine blades (obviously coated with catalyst) or filling the gaps between the turbine blades with a honeycomb (not shown) which would not seriously impede the gas flow. In diffuser design, this is called the egg box principle.

Essentially, the dirty gas stream will be saturated with a damp agglomerated particulate matter, i.e. sulphated fine carbon particles, and this will have to be immediately separated by a cartridge filter or some other similar device.

The device will function equally well with an internal combustion engine or burning liquefied gas.

It will be appreciated that the basic principles of the invention may also be utilized in an application which removes sulphur from certain gas streams, and may be utilized in automobiles, ships, railway engines, off-road vehicles, plant and machinery, and other transit systems, power stations, coal utilization, oil platforms, gas or oil burning boilers, and metal production.

There are numerous other applications of a fluid centrifuge in accordance with the invention, including the clean up of $SO_2$ emissions from coal fired boilers.

At present, expensive flue gas desulphurisation plants are needed on power stations, or alternatively use is made of fine limestone/dolomite which is injected into the combustion chamber.

Figure 16:
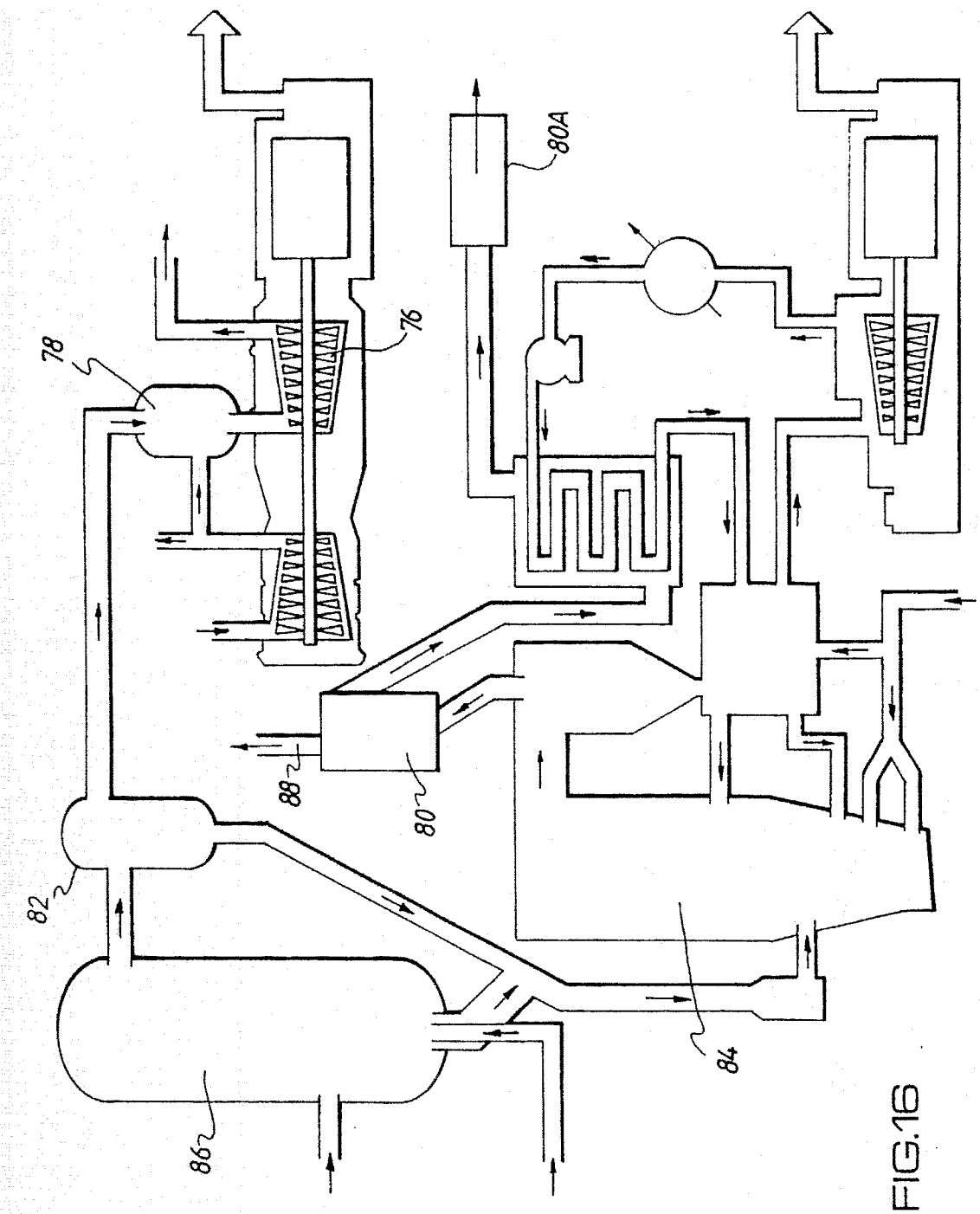
FIG. 16 is a pictorial representation of a generating plant utilizing a device in accordance with the invention.

The use of technology in accordance with the invention would be a viable alternative for the removal of $SO_2$, and an added benefit would be the removal of very fine particulate matter. The invention would provide a novel system for the removal of $SO_2$ for the new proposed combined cycle, coal fired, power generation systems being evolved, where high enthalpy gases are produced at high pressure and undergo various pressure phases as they pass through gas clean up systems, a gas turbine 76 and eventually a steam or waste heat boiler 78, as shown in FIG. 16. A fluid centrifuge module is indicated by reference numeral 80.

In general, two gas clean up paths are followed by such systems. Firstly a low temperature system whereby fine solids and sulphur are removed by standard chemical type processes, and secondly a high temperature system whereby fine particulates are removed by a combination of a cyclone 82 followed by a high temperature filter. Such systems are normally based on some form of fluidized bed technology with a sorbent added to a fluidized bed 84 for sulphur retention. This sorbent normally has to be added at quite high molar rate to achieve the effective sulphur absorption, resulting in increased particulate emissions relative to other systems and hence the expense in gas clean up.

Fluid centrifuges 80, as previously described, could be beneficially incorporated into the system to give both fine particulate and sulphur removal. The use of such centrifuges relies on the availability of the gases at a pressure difference of say 0.5 bar in order to provide the power to drive the centrifuge module.

There are several places, it will be understood, where installation of the centrifuges may be made, including the exhaust from the PFB gasifier 86, before the waste heat recovery boiler 78 and the exhaust of the gas turbine 76.

Installation is needed in a place where excess $O_2$ is present in order to obtain good $SO_2$ to $SO_3$ conversions, although another possibility is the reduction of $SO_2$ to S.

The concentrated dirty gas stream 88 containing fine particulates and sulphates would be separated into say 5% to 20% of the total gas flow which would then pass to a small separate low temperature gas clean up system.

It is thought that it would be advantageous to only clean the gas leaving the PFB gasifier 86, the waste heat recovery boiler 78 and fluidized bed 84 of material of size above 2 to 3 micron (possibly within the range of conventional cyclones) allowing the fine particulate material to pass through the gas turbine 76 and then to the centrifuge where it would act as a condensation nuclei sulphate condensation processes.

In FIG. 16, gas centrifuge 80 is only intended to remove fine particulate matter and not sulphates, as it operates above the sulphate condensation temperature.

Alternatively, fine soot particles could be injected upstream of the centrifuge assembly to act as the nucleation centers.

Considerable benefits accrue if the sorbent (dolomite) injection is eliminated.

A fluid centriguge 80A, operating in the final exhaust, is designed to remove sulphated fine particulate matter in the temperature range 100° C. to 200° C. It will be understood that both units may not be needed.

The next generation of solid fuel fired power stations will use a so-called 'gasifier' in which the solid fuel is partially burnt/heated under special conditions such that all of the fuel is turned into high pressure gas which consists of carbon monoxide, hydrogen, methane, etc.

The gas is passed through a cleaning system to eliminate particulate matter, tars and $SO_2$ and $SO_3$ from combustion of sulphur in the fuel.

Gases are often cooled to very low temperatures (i.e. 50° C. to 100° C.) from their original temperature of 1200° C. to 1500° C. in order to achieve clean up.

The fluid centrifuge could well form the basis of a hot gas clean up system for such systems, not only removing particulate matter to say 10% to 20% of the total flow, but also $SO_2$ and $SO_3$ by the sulphur removal process previously described. After clean up, the gases are passed to a gas turbine where more air is added for combustion. Some power is generated here. The hot exhaust gases from the gas turbine are then passed to a waste heat boiler where steam/power are generated by conventional means.

Many variations are possible in accordance with the wide variety of combined cycles proposed.

The possibility of using an integrated fluid centrifuge for a number of different problems which arise in the coal extraction and power generation processes and utilization.

A further application of the invention is the removal of methane in a number of situations. This is gas from gas separation and the movement of the light gas, i.e. methane, to the center of the centrifuge to be separated. Strong centrifugal forces are used to concentrate the light gas, methane, (molecular weight 16) into a small fraction of the total air flow whose molecular weight is 28.7. Methane is thirty times more effective than carbon dioxide as a greenhouse gas. Ventilation air from mineshafts contain methane in known quantities. Vast amounts are produced and the problem is to eliminate the methane at minimum cost.

Thus referring to FIG. 17, a long centrifuge 90 of the order of 5 meters in length, supported on very low friction bearings 92 and rotating at a speed in the range of 50,000 to 100,000 rpm so as to give a peripheral speed of 300 m/s (just below Mach 1) for air at 20° C., is used to concentrate the methane into 10% to 20% of the air. The methane is then compressed to say 0.3 bar and burnt in a combuster, the resultant hot gases being used to drive the centrifuge turbine 94. This is indicated by the flow indications in FIG. 17. An axial flow fan 96 will be located at the inlet of the centrifuge to induce gas to flow into the inlet. Excess energy may be available in sufficient quantities to drive the fan compressor.

Thus the methane now at 1% to 1.5% concentration in 10% to 20% of air is burnt in special combusters down to a concentration of about 1.25% without support fuel.

The basic principles of the above may also be utilized in other applications related to methane, such as mine shafts, land fill sites, sewage works, material processing and recycling plants and agricultural systems. It will be appreciated that while methane enhancement is described above, the basic principles of the fluid centrifuge device allows other gas from gas separation processes not herein described.

It has been impossible for previously proposed devices to perform removal of both large particles such as sand and small particles such as extremely fine dust from the atmosphere, or air intake for an engine, or in the ventiliation system of a sealed compartment.

A pre-cleaner for separating the air-borne particles such as dust, fibers, dirt, sand, sinew and the like, from the air prior to the passage of the air to the aforesaid precleaner is therefore proposed. Such a pre-cleaner will also remove small dust particles which are a carrier of radiation in industrial applications and a post nuclear environment.

A pre-cleaner when used with an internal combustion engine will promote a more efficient and cleaner combustion, and longer engine life. Thus referring to FIG. 18 there is located at the inlet to the centrifuge 100 a protective nose cone 102 which will prevent large particles from entering the centrifuge, and so will pre-clean the air passing into the centrifuge.

The device may be operated as part or total of the intake system of an engine, removing particulate matter from the airstream particularly in unfriendly environments.

It will be appreciated that the basic principles of the device may also be applied in situations where a 'clean atmosphere' is required and may be utilized in connection with bacteria and medical situations, air conditioning systems, military applications, the nuclear industry, in the computer and food production fields, and in process industries such as cement, pharmaceuticals, etc.

The fluid centrifuge in accordance with the invention has obvious applications across the electronics field, the manufacture of micro chips etc, where absolute cleanliness is needed; control of viruses, bacteria, other organisms etc in biomedical fields; the nuclear industry in removing fine radioactive particles from gases.

Basically, almost all systems use large, very expensive filters to filter all air/gas entering the system. As gas face velocities are low, filter areas are large. Clogged up old filters are often difficult to dispose of if they contain undesirable materials, and are also expensive to maintain and replace over a long period. Such filters will be replaced by a series of fluid centrifuges (electrically driven) in accordance with the principles of the present invention; the 5% to 10% dirty gas will be fed to a series of very much smaller filters, probably operated at high face velocities and consequently able to absorb more material. Inevitably, filter pressure drop will be higher, but this is sustainable when only 5% to 10% of the total gas flow is being treated.

The principles of the invention are also applicable in the field of cryogenics, i.e. the production of $O_2$, $N_2$, $CO_2$, Argon, $M_2$, $M_e$ etc, and the separation of gases. This is conventionally an expensive process in general involving big compressors, pumps and refrigeration circuits which are often not very efficient.

With appropriately sized centrifuges in accordance with the invention and appropriately sited in a cryogenics plant, it should be possible to get improved separation of $O_2$, $CO_2$, $N_2$ in air, thus improving the efficiency of the remainder of the cycle.

Thus it is proposed to place a plurality of centrifuges in accordance with the invention in the appropriate parts of a new or existing cryogenics plant, so that there is, for instance, a higher percentage of $O_2$ in the system, thereby improving dramatically the overall efficiency of the plant.

In the above-described embodiments, cooling fins may be applied to any or all parts of the arrangements, such fins creating a cooling effect and causing a decrease in the volume of gases being exhausted in comparison to the volume of gases entering the device.

The containment separator vessel may be provided with a temperature control jacket and insulation between the jacket and vessel. Pipes or elements are surrounded by said insulation and are used to control the temperature around the vessel containing the shroud. The containment separator vessel and shroud may be provided with grooves on their inner surfaces, and the vessel may be provided with coolant or air inlets and outlets.

The shroud may have perforated or open end caps supported by spiders or struts which are mounted in bearings and which retain the shroud in position by threaded securing rings, the direction of the threads being dependent upon the rotational direction of the device.

For some uses and applications, it may be necessary to utilize the assistance of a fan or blower and the power source to provide suction or thrust.

While not shown in the drawings, there may be further turbine blades at the opposite end[ of the device.

The turbine blades may extend down the length of the shroud and/or the drive shaft in et continuous manner, or they may be so constructed to be in a series of separate turbines working in harmony. It will also be appreciated that separation efficiency may be enhanced by an increase in the length of the containment separator vessel and shroud and a consequential decrease in pressure drop.

Fluid centrifuge devices in accordance with the invention may be made in a monolithic or in a split form.

Finally, fluid centrifuge devices in accordance with the present invention may be used in material classification, such as for example in the grading of materials in the manufacture of powders, paint and similar operations.

I claim:

1. A fluid centrifuge device comprising:

a stationary containment vessel, said containment vessel having a first end and a second end;

a rotatable shroud, said shroud being disposed within said containment vessel, said shroud being rotatable about an axis of rotation within said containment vessel;

a rotatable matrix, said matrix being disposed within said containment vessel, said matrix being rotatable about said axis of rotation within said containment vessel, said matrix being coated with a catalyst so as to promote the formation of particles;

an inlet assembly, said inlet assembly being connected to said first end of said containment vessel;

an outlet assembly, said outlet assembly being connected to said second end of said containment vessel; and means for rotatably driving said shroud and said matrix.

2. The fluid centrifuge device as defined in claim 1, further comprising a particle collector or trap connected to said outlet assembly.

3. The fluid centrifuge device as defined in claim 1, wherein said containment vessel is provided on its inner surface with steps which create recesses to prevent drag on said shroud and which reduce any leakage flow of fluids passing through said device.

4. The fluid centrifuge device as defined in claim 1, wherein the shape of said shroud conforms to the shape of said containment vessel.

5. The fluid centrifuge device as defined in claim 1, wherein said shroud is coated with a catalyst.

6. The fluid centrifuge device as defined in claim 1, wherein said shroud is parallel sided.

7. The fluid centrifuge device as defined in claim 1, wherein said shroud has the shape of a cone.

8. The fluid centrifuge device as defined in claim 1, wherein said shroud is connected to said matrix so as to be rotatable therewith.

9. The fluid centrifuge device as defined in claim 1, wherein said shroud is connected to a rotatable turbine so as to be rotatable therewith.

10. The fluid centrifuge device as defined in claim 1, wherein said shroud is connected to a rotatable drive shaft of said drive means so as to be rotatable therewith.

11. The fluid centrifuge device as defined in claim 1, wherein said shroud contains multiple concentric shrouds so as to provide additional rotating surfaces for accelerating fluids and particles as they pass through said device.

12. The fluid centrifuge device as defined in claim 11, wherein said internal concentric shrouds have walls having perforations formed therein so that fluids and particles may pass therethrough.

13. The fluid centrifuge device as defined in claim 11, wherein said shroud is provided with perforated end plates so that fluids and particles may pass therethrough.

14. The fluid centrifuge device as defined in claim 1, wherein said inlet assembly is internally coated with a catalyst.

15. The fluid centrifuge device as defined in claim 1, wherein said inlet assembly is provided with a rotatable turbine for accelerating fluids and particles prior to their entering said containment vessel.

16. The fluid centrifuge device as defined in claim 15, wherein said turbine is connected to a rotatable drive shaft of said drive means so as to be rotatable therewith.

17. The fluid centrifuge device as defined in claim 16, wherein said turbine is coated with a catalyst.

18. The fluid centrifuge device as defined in claim 1, wherein said inlet assembly is provided with a rotatable turbine for accelerating fluids and particles prior to their entering said matrix.

19. The fluid centrifuge device as defined in claim 18, wherein said turbine is connected to a rotatable drive shaft of said drive means so as to be rotatable therewith.

20. The fluid centrifuge device as defined in claim 19, wherein said turbine is coated with a catalyst.

21. The fluid centrifuge device as defined in claim 1, wherein said outlet assembly is internally coated with a catalyst.

22. The fluid centrifuge device as defined in claim 1, wherein said outlet assembly is provided with an inner fluid outlet and an outer fluid outlet.

23. The fluid centrifuge device as defined in claim 22, further comprising a particle collector or trap connected to said outer fluid outlet of said outlet assembly.

24. The fluid centrifuge device as defined in claim 1, wherein said matrix is connected to said shroud so as to be rotatable therewith.

25. The fluid centrifuge device as defined in claim 1, wherein said matrix is connected to a rotatable turbine so as to be rotatable therewith.

26. The fluid centrifuge device as defined in claim 1, wherein said matrix is connected to a rotatable drive shaft of said drive means so as to be rotatable therewith.

27. The fluid centrifuge device as defined in claim 1, wherein said matrix has the shape of a honeycomb.

28. The fluid centrifuge device as defined in claim 1, wherein all of the internal surfaces of said device are coated with a catalyst.

29. A fluid centrifuge device comprising:

a stationary containment vessel, said containment vessel having a first end and a second end;

a rotatable shroud, said shroud being disposed within said containment vessel, said shroud being rotatable about an axis of rotation within said containment vessel;

an inlet assembly, said inlet assembly being connected to said first end of said containment vessel;

a rotatable matrix, said matrix being disposed within said inlet assembly, said matrix being rotatable about said axis of rotation within said inlet assembly, said matrix being coated with a catalyst so as to promote the formation of particles;

an outlet assembly, said outlet assembly being connected to said second end of said containment vessel; and means for rotatably driving said shroud and said matrix.

30. The fluid centrifuge device as defined in claim 29, further comprising a particle collector or trap connected to said outlet assembly.

31. The fluid centrifuge device as defined in claim 29, wherein said containment vessel is provided on its inner surface with steps which create recesses to prevent drag on said shroud and which reduce any leakage flow of fluids passing through said device.

32. The fluid centrifuge device as defined in claim 29, wherein the shape of said shroud conforms to the shape of said containment vessel.

33. The fluid centrifuge device as defined in claim 29, wherein said shroud is coated with a catalyst.

34. The fluid centrifuge device as defined in claim 29, wherein said shroud is parallel sided.

35. The fluid centrifuge device as defined in claim 29, wherein said shroud has the shape of a cone.

36. The fluid centrifuge device as defined in claim 29, wherein said shroud is connected to said matrix so as to be rotatable therewith.

37. The fluid centrifuge device as defined in claim 29 wherein said shroud is connected to a rotatable turbine so as to be rotatable therewith.

38. The fluid centrifuge device as defined in claim 29, wherein said shroud is connected to a rotatable drive shaft of said drive means so as to be rotatable therewith.

39. The fluid centrifuge device as defined in claim 29, wherein said shroud contains multiple concentric shrouds so as to provide additional rotating surfaces for accelerating fluids and particles as they pass through said device.

40. The fluid centrifuge device as defined in claim 39, wherein said internal concentric shrouds have walls having perforations formed therein so that fluids and particles may pass therethrough.

41. The fluid centrifuge device as defined in claim 40, wherein said shroud is provided with perforated end plates so that fluids and particles may pass therethrough.

42. The fluid centrifuge device as defined in claim 29, wherein said inlet assembly is internally coated with a catalyst.

43. The fluid centrifuge device as defined in claim 29, wherein said inlet assembly is provided with a rotatable turbine for accelerating fluids and particles prior to their entering said containment vessel.

44. The fluid centrifuge device as defined in claim 43, wherein said turbine is connected to a rotatable drive shaft of said drive means so as to be rotatable therewith.

45. The fluid centrifuge device as defined in claim 44, wherein said turbine is coated with a catalyst.

46. The fluid centrifuge device as defined in claim 29, wherein said inlet assembly is provided with a rotatable turbine for accelerating fluids and particles prior to their entering said matrix.

47. The fluid centrifuge device as defined in claim 46, wherein said turbine is connected to a rotatable drive shaft of said drive means so as to be rotatable therewith.

48. The fluid centrifuge device as defined in claim 47, wherein said turbine is coated with a catalyst.

49. The fluid centrifuge device as defined in claim 29, wherein said outlet assembly is internally coated with a catalyst.

50. The fluid centrifuge device as defined in claim 29, wherein said outlet assembly is provided with an inner fluid outlet and an outer fluid outlet.

51. The fluid centrifuge device as defined in claim 50, further comprising a particle collector or trap connected to said outer fluid outlet of said outlet assembly.

52. The fluid centrifuge device as defined in claim 29, wherein said matrix is connected to said shroud so as to be rotatable therewith.

53. The fluid centrifuge device as defined in claim 29, wherein said matrix is connected to a rotatable turbine so as to be rotatable therewith.

54. The fluid centrifuge device as defined in claim 29, wherein said matrix is connected to a rotatable drive shaft of said drive means so as to be rotatable therewith.

55. The fluid centrifuge device as defined in claim 29, wherein said matrix has the shape of a honeycomb.

56. The fluid centrifuge device as defined in claim 29, wherein all of the internal surfaces of said device are coated with a catalyst.

57. A fluid centrifuge device comprising:

a stationary containment vessel, said containment vessel having an input end and an output end;

a rotatable shroud, said shroud being disposed within said containment vessel, said shroud being rotatable about an axis of rotation within said containment vessel;

a matrix assembly, said matrix assembly having a stationary outer body and a rotatable inner matrix, said outer body having an input end and an output end, said output end of said outer body being connected to said input end of said containment vessel, said inner matrix being rotatable about said axis of rotation within said outer body, said inner matrix being coated with a catalyst so as to promote the formation of particles;

an inlet assembly, said outlet assembly being connected to said input end of said outer body;

an outlet assembly, said outlet assembly being connected to said output end of said containment vessel; and means for rotatably driving said shroud and said inner matrix.

58. The fluid centrifuge device as defined in claim 57, further comprising a particle collector or trap connected to said outlet assembly.

59. The fluid centrifuge device as defined in claim 57, wherein said inlet assembly is provided with a turbine for accelerating fluids and particles prior to their entering said matrix assembly.

* * * * *